Patented Aug. 25, 1942

2,294,145

UNITED STATES PATENT OFFICE 2,294,145

METHOD OF IMPROVING A MINERAL OIL AS TO ITS FOAMING PROPERTIES

Carl Winning, Union, Robert L. Van Voorhies, Elizabeth, and John G. McNab, Cranford, N. J., assignors to Standard Oil Development Company, a corporation of Delaware No Drawing. Application November 30, 1940, Serial No. 367,916

9 Claims. (Cl. 252—53)

This invention relates to an improved process for preparing lubricating oil compositions containing metal oxy organic compounds such as metal alkoxy compounds and metal aroxides, which are effective detergents and improving agents for hydrocarbon lubricating oils.

The invention relates more particularly to an improved process for preparing mineral oil compositions in which improving agents are prepared directly in solution in the lubricating oil medium in which they are to be used.

It has already been proposed to prepare lubricating oil compositions by addition of a separately prepared metal oxy organic compound to suitable lubricating oils, but such methods involve the disadvantages attendant upon the separate preparation of the addition agents and the further disadvantages of incorporating these compounds in the lubricating oil, as these compounds often dissolve in lubricating oils only very slowly and with extreme difficulty. An improved process has now been found for preparing such lubricating oil compositions in which the desired metal oxy organic compounds are formed directly in the oil.

It has also been found that in preparing the oxy organic compounds, water and/or other reaction products are formed which are volatile under the reaction conditions and serious difficulties are encountered due to the formation of foam, emulsions, and the like. Also, in many cases, the resulting oil solutions are so greatly thickened by the metal oxy organic compounds that they cannot be treated conveniently to remove unreacted materials, impurities, solvents for the reagents, and the like.

A further purpose of this invention is to provide a method for preparing the metal oxy organic compounds directly in lubricating oils, while avoiding or greatly suppressing these undesirable factors. Other and further objects of this invention will be apparent from the following description and the claims.

The following examples are presented to illustrate suitable methods for carrying out the process of this invention and to indicate its advantages:

Example 1

Diisobutyl hydroxy phenyl sulfide (bis-tetramethyl butyl hydroxy phenyl sulfide) was prepared by reacting diisobutyl phenol with sulfur chloride. 116 grams of this product were dissolved in 600 grams of a naphthenic base oil having a viscosity of 55 seconds Saybolt at 210° F. The solution was agitated and heated to a temperature of 215–225° F. whereupon the gradual addition of 85 grams of barium hydroxide octahydrate, $Ba(OH)_2.8H_2O$, was begun, the mixture being blown with nitrogen to remove water liberated. When about one-fifth of the desired amount of barium hydroxide had been added, serious foaming of the mixture was encountered, the foaming becoming worse as more barium hydroxide was added. In order to proceed with the reaction, it was found necessary to dispense with the motor driven agitator and to stir the mixture by hand during the slow addition of the barium hydroxide. After the latter had all been added, the mixture was blown with nitrogen at 240° F. for an additional half-hour period. The resulting product was a 20% solution of barium diisobutyl hydroxy phenyl sulfide in mineral oil. The concentrate was found to be so viscous that difficulty was encountered in filtering it to remove insoluble material (unreacted $Ba(OH)_2$, $BaCO_3$, etc.); it was, therefore, diluted with 750 grams of the same oil to give a 10% concentrate which was filtered through paper with the aid of "Hyflow" (a diatomaceous earth type of filter aid).

Example 2

To 525 grams of a naphthenic base oil (approximately 55 sec. Saybolt viscosity at 210° F.) were added 116 grams of diisobutyl hydroxy phenyl sulfide and 75 grams of lauryl alcohol. The mixture was agitated and its temperature raised to 210° F. The gradual addition of 85 grams of barium hydroxide octahydrate, $Ba(OH)_2.8H_2O$, was then begun, water liberated during the reaction being removed by blowing the mixture with nitrogen. (The 85 grams of $Ba(OH)_2.8H_2O$ represents 5% excess over the theoretical amount required, to allow for impurities such as barium carbonate.) Some foaming occurred, but this was much less than that observed in Example 1 and could readily be controlled by the rate of barium hydroxide addition. Also, less foaming was experienced when the reaction temperature was raised to 230° F. Following the addition of the final portion of barium hydroxide, the oil concentrate was blown with nitrogen for a half-hour period at 230° F. and then filtered through paper using "Hyflow." The resulting concentrate, containing 20% barium diisobutyl hydroxy phenyl sulfide and 10% lauryl alcohol, was a free-flowing, light-colored product which blended readily with mineral lubricating oils by slight heating and stirring.

*Example 3*

232 grams of diisobutyl hydroxy phenyl sulfide and 75 grams of stearyl alcohol were dissolved in 1125 grams of a naphthenic base lubricating oil having a Saybolt viscosity of about 55 seconds at 210° F. To this were added gradually and with stirring, 170 grams of Ba(OH)$_2$.8H$_2$O, the reaction being carried out at a temperature of 215–230° F. Although some foaming was experienced, it was readily controlled. The resulting concentrate of 20% of the barium salt of diisobutyl hydroxy phenyl sulfide and 5% of stearyl alcohol was then filtered to obtain the final product, which was a free-flowing, clear, light-colored solution.

*Example 4*

Example 3 was repeated except that for the naphthenic oil there was substituted 1125 grams of a highly extracted Mid-Continent base lubricating oil of approximately 52 seconds viscosity Saybolt at 210° F. and a viscosity index of 100. Also in this case the product was a free-flowing, clear, light-colored solution.

*Example 5*

226 grams of diisobutyl hydroxy phenyl sulfide were dissolved in 1125 grams of an extracted Mid-Continent lubricating oil together with 75 grams of stearyl alcohol. To this were added very slowly and in small portions 105 grams of barium hydroxide monohydrate, Ba(OH)$_2$.H$_2$O, the temperature of the mixture being kept at 220° F. and the mixture being stirred and blown with nitrogen during this step. As in the example previously given, the blowing with nitrogen was continued for 30 minutes after all of the barium hydroxide had been added, and the final product was then filtered. The concentrate of the barium salt of diisobutyl hydroxy phenyl sulfide (20% in oil) and stearyl alcohol (5%) was found on analysis to contain 4.17% barium.

*Example 6*

A 31% solution of diisobutyl phenol in chloroform, containing a total of 217 lbs. of diisobutyl phenol, was placed in a reaction vessel. Over a period of 3 hours 80.6 lbs. of sulfur chloride, SCl$_2$, were added gradually, the temperature of the mixture being held at 20–25° C. Following this step, the mixture was heated under reflux for two hours and the chloroform then removed by heating to 100° C. Finally, the product was blown with carbon dioxide for several hours until neutral to Congo red paper.

The amount of diisobutyl hydroxy phenyl sulfide present in the reactor after the above procedure was estimated to be 238 pounds. About 395 lbs. of an extracted Mid-Continent lubricating oil (about 52 secs. viscosity, Saybolt at 210° F.) were pumped into the reactor and mixed with the diisobutyl hydroxy phenyl sulfide. While agitation was continued, the temperature was raised to 210° F. and a stream of nitrogen under 2 lbs./sq. in. pressure was blown in at the bottom of the reactor. Then 75 lbs. of stearyl alcohol were added and the temperature raised to 230° F. Gradual addition of 185 lbs. of a technical grade of barium hydroxide octahydrate, Ba(OH)$_2$.8H$_2$O, was then begun, the temperature first being raised to 240° F. and the stream of nitrogen continued. No excessive foaming occurred until about 85% (163 lbs.) of the barium hydroxide had been added (requiring about 6 hours). It was found that the foaming could be controlled by raising the temperature to 250° F. whereupon the balance of the barium hydroxide was added. Following this, the batch was blown with nitrogen for one hour at 230° F. to remove all water. Four pounds of "Hyflow" filter aid were added and the mixture filtered at 260° F., yielding a concentrate, in oil, of 40% of the barium salt of diisobutyl hydroxy phenyl sulfide and 10% of stearyl alcohol. Analysis indicated 9.02% barium, almost exactly the theoretical amount for a 40% solution of the barium salt of diisobutyl hydroxy phenyl sulfide, Ba(O—C$_6$H$_3$—C$_8$H$_{17}$)$_2$S.

*Example 7*

A solution of 113 grams of diisobutyl hydroxy phenyl sulfide and 33 grams of stearyl alcohol in 495 grams of extracted Mid-Continent lubricating oil was heated to 225° F. To this were added gradually, with agitation, 28 grams of potassium hydroxide, nitrogen gas being blown through the mixture to remove water generated in the reaction. Agitation was then continued for one hour during which time the mixture became distinctly yellow in color. The product was finally filtered, giving a 15.8% solution of the dipotassium salt of diisobutyl hydroxy phenyl sulfide in the lubricating oil which also contained 4% stearyl alcohol.

*Example 8*

The procedure of Example 7 was followed, but using only 14 grams of potassium hydroxide. This gave a 15.8% blend of the monopotassium salt of diisobutyl hydroxy phenyl sulfide plus 4% stearyl alcohol.

*Example 9*

In 620 grams of an extracted Mid-Continent lubricating oil, as described in Example 4, 113 grams of diisobutyl hydroxy phenyl sulfide and 31 grams of stearyl alcohol were dissolved and the blend heated to 220° F. with stirring. At this temperature 20 grams of sodium hydroxide pellets were added and the oil blown with nitrogen for one hour, the temperature rising to 280° F. It was found that 9.9 grams of the hydroxide did not react and that only the monosodium salt of diisobutyl hydroxy phenyl sulfide was formed, although sufficient alkali had been used to make the disodium derivative.

*Example 10*

Using the same procedure as in Example 9 a solution of 20 grams of sodium hydroxide in 250 cc. of absolute ethanol was reacted with 113 grams of diisobutyl hydroxy phenyl sulfide dissolved in 465 grams of a Mid-Continent base lubricating oil containing 31 grams of stearyl alcohol. The ethyl alcohol and water were stripped out by bubbling nitrogen through the reaction mixture heated to 225° F. The resulting product contained 20% of the disodium salt of diisobutyl hydroxy phenyl sulfide and 5% stearyl alcohol dissolved in the lubricating oil.

The process of this invention may be used generally to prepare metal derivatives of organic compounds having weakly acidic hydroxyl groups by reaction with basic acting metal compounds and metals capable of displacing hydrogen from an organic hydroxyl group, such as the metals of groups I to IV of the periodic system, and their basic acting compounds such as the oxides, hydroxides, carbonates, alkoxides of low molecular weight alcohols having preferably less than about 4 carbon atoms in the alkyl group, and the like. Suitable reagents are indicated by the following equation:

$$M^+ + nR'ZH \rightarrow M(ZR')_n + H^+$$

in which $M^+$ represents a metal of groups I to IV in the form of the free metal or of basic acting compounds of the type described above containing the desired metal as the cation, especially sodium, potassium, magnesium, calcium, strontium and barium, R' represents an organic radical of at least 6 carbon atoms and having a carbon atom linked to Z and also linked only to carbon and hydrogen, Z represents oxygen, sulfur, selenium or tellurium and $n$ is a number from 1 up to that sufficient to satisfy valence requirements. Lead is used in this reaction preferably in the form of the oxide, while aluminum and tin are preferably used as freshly prepared hydroxides.

The organic radical R' in the initial reagents should of course be so selected that the resulting compound having the characteristic radical $M(ZR')_n$ is soluble in the hydrocarbon oil reaction medium. In the event that the radical R' is wholly aliphatic, it should contain at least 6 carbon atoms and preferably 10 to 12 or more carbon atoms per molecule, while organic radicals R' which contain an aryl radical should also have one or more alkyl groups which contain a total of preferably at least 10 carbon atoms in the molecule in order to insure adequate solubility of the metal salts resulting from the reaction.

The present invention may thus be used to prepare metal derivatives from organic compounds generally of the classes described above which contain a weakly acidic hydroxyl group, including especially the higher alcohols, phenols, alkyl and aryl mercaptans and isomers of such compounds which have enolic hydroxyl groups. It is particularly useful in the preparation of metal phenates from alkyl phenols and phenolic compounds having condensed nuclei such as alkyl naphthols and the like. Other derivatives of all such phenolic compounds may also be used in which other substituent groups may be attached to the aromatic nucleus such as chlorine and other halogens, also amino groups, particularly hydrocarbon substituted amino groups such as dimethyl amine and the like, also oxygen, sulfur, selenium or tellurium. The process is especially applicable to the preparation of metal derivatives from the thioalkylphenols and the thioethers and disulfides of the above described alkyl phenolic compounds and derivatives thereof. Particularly suitable examples thereof are the alkyl hydroxy phenyl sulfides (thioethers, disulfides, etc.) which preferably have the general empirical formula:

[HOAr(R)]$_2$S$_x$ where $x$ is 1 or more, Ar is an aryl nucleus, and R represents one or more alkyl groups, having enough carbon atoms, preferably a total in the molecule of at least 10, to insure solubility of the compounds in mineral oil.

The metal derivatives may have one or more of the hydroxyl hydrogens replaced by a linkage to one or more metal atoms as in MOAr(R)—S$_x$—(R)ArOH

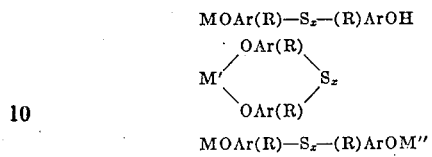

MOAr(R)—S$_x$—(R)ArOM'' in which Ar, R and $x$ have the same significance as above, M and M'' represent mono- or polyvalent metals, M' represents a polyvalent metal, other valences of the polyvalent metals being satisfied in each of these formulae by the same or different organic radicals or inorganic radicals.

The metal salts are preferably prepared by the process of this invention from phenolic compounds readily obtainable by alkylation of the simple phenols and cresols or by extraction from high-boiling petroleum oils.

Petroleum phenols are considered to contain polymethylene or cycloalkyl substituents, as evidenced by their hydrogen and carbon analysis. The petroleum phenols are obtained by extraction of various stocks, chiefly cracking process heating oil stocks, with caustic soda, and acidification of the alkaline extract with a weak mineral acid followed by a nondestructive distillation if desired.

Suitable synthetic alkyl phenols for preparing the desired metal salts are those containing one or more substituents which provide the desired number of carbon atoms in groups having the form of straight chains, branched chains, or rings. Mono-alkyl or poly-alkyl phenols are synthesized conveniently by alkylating a phenol with branched chain olefin polymers, such as diisobutylene, triisobutylene, di-tert-amylene, or other suitable alkylating agents, such as alcohols, alkyl sulfates, alkyl phosphates, or alkyl halides, thereby forming carbon-to-carbon bonds between the aromatic nucleus and the alkyl group.

Commonly, the alkylation reaction involves a condensation of olefins with the simple phenols, the reaction being catalyzed by anhydrous metal halides, sulfuric acid, phosphoric acid, or certain activated clays. As olefinic reactants, refinery gases containing propylene, butylenes, amylenes, etc., are economically useful, although individual olefins, e. g., isobutylene, iso-amylene, diisobutylene, triisobutylene, etc., or olefin-containing mixtures from other sources may be used. The reaction temperature is usually controlled to avoid side reactions. In employing sulfuric acid, a liquid phase reaction at relatively low temperature is preferred; with phosphoric acid the reaction may be carried out in the vapor phase.

By using the described methods or any other well-known method for obtaining alkyl phenols, the following alkylated phenols may be procured for preparing the desired salts: tert-amyl phenol, iso-hexyl phenol, diisobutyl phenol, di-tert-butyl phenol, di-(di-isobutyl) phenol, etc. By "diisobutyl phenol" is meant phenol having a branched octyl group, which may be obtained by reacting phenol with diisobutylene; this product is also called tetramethylbutyl phenol.

Inorganic substituents are introduced into alkyl phenols by well-known methods. For example, an alkyl phenol, e. g. tert-amyl phenol, is reacted with sulfur monochloride, S$_2$Cl$_2$, in about a 2:1 mol ratio and preferably in a solvent such as dichlorethane, to produce the alkyl hydroxy phenyl disulfide. Using substantially the same procedure but substituting sulfur dichloride, SCl₂, for the monochloride, the alkyl phenols are given a thioether linkage; about 0.5–2 mols, preferably 1.25 to 1.5 mols of SCl₂ are used per two mols of alkyl phenol. Suitable processes for conducting this reaction are described in U. S. Patent 2,139,321. The reaction with the sulfur chloride is usually attended by the introduction of some chlorine to the molecule so that in a mixture of reaction products a varying proportion of the molecules contain chlorine as well as sulfur. Because the chlorine may be present in very minor proportions the reaction products are referred to in this invention as hydroxy phenyl sulfides, for convenience, but it is to be understood that they may contain chlorine as well.

Alkyl chlorphenols are also obtained by chlorination, preferably controlled to replace nuclear hydrogen by a chloro group. This may be accomplished by chlorinating the phenol before alkylation. In such a manner, for example, 2-chloro-4-tert amyl phenol can be produced. Nitro substituents are introduced readily into the aromatic nucleus by direct nitration and nitro substituents can be reduced to amino groups. It is to be understood, however, that the preparation of substituted phenolic compounds which have been described does not form part of this invention and that any of the well-known methods for their production may be used.

A variety of metal salts of alkyl hydroxy phenyl sulfides may also be prepared in the process of this invention by substituting polysulfides or polymers such as the dimers, trimers, or tetramers, of the alkyl hydroxy phenyl thioethers, disulfides, and the like, in place of the alkyl hydroxy phenyl thioethers mentioned above. Also, the metal salts of alkyl hydroxy phenyl selenides and tellurides may be prepared, although the sulfur compounds are generally preferred.

Other suitable foam suppressing agents may be used in the processes described in the above examples in place of the lauryl and stearyl alcohols, the higher fatty alcohols having from about 8 to 20 carbon atoms per molecule being preferred for this purpose. The higher fatty alcohols falling in the $C_{12}$ to $C_{20}$ range are especially preferred. The corresponding unsaturated alcohols and other highly aliphatic oxy organic compounds having at least 8 and preferably more than 10 carbon atoms in a straight chain may also be used, although these are generally less effective than the preferred alcohols. Examples of these are the aliphatic oxy derivatives of naturally occurring fats and oils of mineral, vegetable and marine origin, including the esters, ethers, ketones and the like and similar compounds which may be synthetically prepared, as by oxidation of petroleum waxes and other high molecular weight aliphatic compounds.

Examples of these various alcohols are the saturated straight and branched chain aliphatic alcohols such as octyl alcohol $C_8H_{17}OH$, lauryl alcohol, $C_{12}H_{25}OH$, cetyl alcohol, $C_{16}H_{33}OH$, stearyl alcohol, sometimes referred to as octadecyl alcohol, $C_{18}H_{37}OH$, and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol or mixtures of these various alcohols, which may be pure or substantially pure synthetic alcohols.

One may also use mixed naturally occurring alcohols such as those found in wool fat (which is known to contain a substantial percentage of alcohols having about 16 to 18 carbon atoms) and in sperm oil (which contains a high percentage of cetyl alcohol); and although it is preferable to isolate the alcohols from those materials, for some purposes, the wool fat, sperm oil or other natural products rich in alcohols may be used per se. Products prepared synthetically by chemical processes may also be used such as alcohols prepared by the oxidation of petroleum hydrocarbons, e. g. paraffin wax, petrolatum, etc.

The concentration of the foam suppressing agents in the mineral oil vehicle used for the process of this invention is in general proportional to the amount of the reagents used. For example, in preparing a 40% concentrate of the desired salt, concentrations of about 4 to 20% of the fatty alcohols are effective to suppress foaming in the reaction and to increase the stability and ease of handling of the product. For lower concentrations of the desired metal salts, lower concentrations of alcohols suffice.

The mineral oil used as the reaction medium and to dissolve the desired products should have a boiling point somewhat higher than the temperature of the reaction, viscous mineral lubricating oils of proper flash and viscosity for the intended lubricating use being preferably employed. Where it is desired to blend the resulting concentrate with motor oils, the viscosity of the mineral oil reaction vehicle should be above about 35 to 40 seconds Saybolt at 210° F.; with such oil, the addition of 2 to 5% of the resulting product concentrate to a mineral motor lubricating oil base stock will not materially lower the flash point of the oil. Hightly viscous oil media having a viscosity above about 80 seconds Saybolt at 210° F. are not desirable because of difficulties in handling the resulting salt solutions, particularly in filtering operations and at low temperatures.

This invention is not limited to any of the specific examples presented herein, all such being intended for purpose of illustration, as it is intended to claim this invention as broadly as the prior art permits.

We claim:

1. Process for preparing mineral oil solutions of metal derivatives having the formula $$M(ZR)_n$$

comprising reacting an organic compound having the formula $$R(ZH)_n$$

with a basic acting metal compound in the presence of a mineral oil solution containing as a form suppressing agent an oxy organic compound having at least 8 carbon atoms in a straight chain; in said formulae, M represents a metal, Z represents a non-metallic element of group VI, R represents an organic radical having a carbon atom linked to Z and linked also only to carbon and hydrogen and $n$ is a number from 1 up to that sufficient to satisfy valence requirements.

2. Process according to claim 1 in which the said foam suppressing agent is an aliphatic alcohol having from 8 to 20 carbon atoms in the molecule.

3. Process for preparing a mineral oil solution of a metal derivative of an alkyl hydroxy aryl sulfide comprising reacting an alkyl hydroxy aryl sulfide with a basic acting inorganic compound of an alkaline earth metal in the presence of a viscous hydrocarbon oil containing an aliphatic alcohol having from 8 to 20 carbon atoms in the molecule, in a small amount effective to suppress foaming.

4. Process according to claim 3 in which said alkyl hydroxy aryl sulfide is an alkyl hydroxy aryl thioether containing at least 10 carbon atoms in alkyl groups in the molecule.

5. Process according to claim 3 in which said alkyl hydroxy aryl sulfide is an alkyl hydroxy aryl disulfide containing at least 10 carbon atoms in alkyl groups in the molecule.

6. Process according to claim 3 in which said inorganic compound is selected from the class consisting of oxides, hydroxides and carbonates of calcium and barium.

7. Process according to claim 3 in which said aliphatic alcohol is stearyl alcohol.

8. Process according to claim 3 in which said aliphatic alcohol is lauryl alcohol.

9. Process according to claim 3 in which said hydrocarbon oil has a Saybolt viscosity between about 35 and 80 seconds at 210° F.

CARL WINNING.
ROBERT L. VAN VOORHIES.
JOHN G. McNAB.